(12) United States Patent
Kim

(10) Patent No.: US 8,858,329 B2
(45) Date of Patent: Oct. 14, 2014

(54) APPARATUS AND METHOD FOR USING A DEDICATED GAME INTERFACE ON A WIRELESS COMMUNICATION DEVICE WITH PROJECTOR CAPABILITY

(76) Inventor: Christine Hana Kim, San Jose, CA (US)

( * ) Notice: Subject to any disclaimer, the term of this patent is extended or adjusted under 35 U.S.C. 154(b) by 626 days.

(21) Appl. No.: 12/728,275

(22) Filed: Mar. 22, 2010

(65) Prior Publication Data

US 2011/0230261 A1 Sep. 22, 2011

(51) Int. Cl.
| | |
|---|---|
| H04N 13/04 | (2006.01) |
| H04N 9/31 | (2006.01) |
| G03B 21/26 | (2006.01) |
| G06F 3/02 | (2006.01) |
| H04M 1/23 | (2006.01) |
| H04M 1/725 | (2006.01) |
| A63F 13/20 | (2014.01) |
| H04M 1/02 | (2006.01) |

(52) U.S. Cl.
CPC ........ *H04N 9/3185* (2013.01); *A63F 2300/643* (2013.01); *H04M 1/23* (2013.01); *A63F 2300/1031* (2013.01); *A63F 2300/636* (2013.01); *H04M 1/72544* (2013.01); *H04M 1/0256* (2013.01); *A63F 2300/204* (2013.01); *A63F 13/06* (2013.01); *H04N 9/3173* (2013.01); *A63F 2300/1043* (2013.01); *A63F 2300/30* (2013.01); *H04M 1/0272* (2013.01)
USPC ................................ 463/34; 463/37; 463/38

(58) Field of Classification Search
USPC ................................................ 463/34, 37, 38
See application file for complete search history.

(56) References Cited

U.S. PATENT DOCUMENTS

| | | | | |
|---|---|---|---|---|
| 7,284,866 | B2 * | 10/2007 | Buchmann ....................... | 353/42 |
| 7,539,513 | B2 * | 5/2009 | Cathey et al. .............. | 455/556.1 |
| 7,926,958 | B2 * | 4/2011 | Choi et al. .................... | 353/119 |
| 2002/0118824 | A1 * | 8/2002 | Yun .......................... | 379/428.01 |
| 2002/0165024 | A1 * | 11/2002 | Puskala .......................... | 463/40 |
| 2005/0167507 | A1 * | 8/2005 | Swartz et al. ............. | 235/472.01 |
| 2006/0005131 | A1 * | 1/2006 | Tao ................................ | 715/702 |
| 2006/0199607 | A1 * | 9/2006 | Shi et al. .................... | 455/550.1 |
| 2006/0267858 | A1 * | 11/2006 | Yun et al. ........................ | 345/1.1 |
| 2008/0013053 | A1 * | 1/2008 | Anson .............................. | 353/69 |
| 2009/0033880 | A1 * | 2/2009 | Heo et al. ......................... | 353/52 |
| 2009/0046064 | A1 * | 2/2009 | Manalo et al. ................. | 345/164 |
| 2009/0046140 | A1 * | 2/2009 | Lashmet et al. ................. | 348/51 |
| 2009/0051658 | A1 * | 2/2009 | Frohlund .......................... | 345/169 |
| 2009/0088218 | A1 * | 4/2009 | Kim et al. ....................... | 455/566 |
| 2009/0153749 | A1 * | 6/2009 | Mixon .......................... | 348/744 |
| 2009/0244022 | A1 * | 10/2009 | Masuda et al. ................. | 345/173 |
| 2009/0290129 | A1 * | 11/2009 | Yoshida .......................... | 353/31 |

(Continued)

*Primary Examiner* — Lawrence Galka
(74) *Attorney, Agent, or Firm* — Invent Capture, LLC.; Samuel S. Cho

(57) ABSTRACT

Apparatuses and methods are disclosed for a game interface on a wireless communication device with projector capability. In one example, an apparatus has an integrated projector lens on a casing of a wireless communication device and a dedicated game interface with a directional control and a fire button. In another example, an apparatus has a dedicated game interface with at least one directional control, a fire button, and a projector body with a projector lens which can extend from, retract to, or dock with a casing of a wireless communication device. Furthermore, this apparatus may include a novel hardware and/or software module which can invert, adjust, and/or re-orient a desired image before a corrected orientation of the desired image is projected from the integrated projector lens, depending on frontal, rear, or another surface usage of the wireless communication device by the user.

8 Claims, 8 Drawing Sheets

(56) References Cited

U.S. PATENT DOCUMENTS

| | | | |
|---|---|---|---|
| 2010/0002151 A1* | 1/2010 | Pan | 348/744 |
| 2010/0020103 A1* | 1/2010 | Ure | 345/660 |
| 2010/0022274 A1* | 1/2010 | Roberts et al. | 455/566 |
| 2010/0026818 A1* | 2/2010 | Yang et al. | 348/207.99 |
| 2010/0031201 A1* | 2/2010 | de Haan | 715/863 |
| 2010/0070931 A1* | 3/2010 | Nichols | 715/863 |
| 2010/0085705 A1* | 4/2010 | Yin et al. | 361/679.58 |
| 2010/0197354 A1* | 8/2010 | Lee et al. | 455/566 |
| 2010/0259730 A1* | 10/2010 | Sip et al. | 353/98 |
| 2010/0309442 A1* | 12/2010 | Sadhu | 353/79 |
| 2011/0019162 A1* | 1/2011 | Huebner | 353/79 |
| 2011/0039608 A1* | 2/2011 | Hsiao | 455/575.3 |
| 2011/0176119 A1* | 7/2011 | Jung et al. | 353/79 |

* cited by examiner

APPARATUS AND METHOD FOR USING A DEDICATED GAME INTERFACE ON A WIRELESS COMMUNICATION DEVICE WITH PROJECTOR CAPABILITY

BACKGROUND OF THE INVENTION

The present invention generally relates to a wireless communication device. More specifically, the present invention relates to an apparatus and a method for using a dedicated game interface on a wireless communication device with projector capability.

As wireless communication devices such as cellular phones and portable computers integrate traditionally standalone features into their hardware packaging, some projectors in recent years are sufficiently miniaturized for device-level integration into some wireless communication devices. Miniaturized projectors typically use digital light processing (DLP) technology and may one day become an integral part of many wireless communication devices, similar to a prolific integration of digital cameras into cellular phones in recent years. Although some cellular phone manufacturers have demonstrated prototypes for potential commercial release of miniaturized projectors in cellular phones, a lack of good contrast ratio and/or power consumption-related issues are currently delaying most consumer-level product launches. Furthermore, a potential synergy of an integrated projector to a wireless communication device such as a cell phone or a portable computer has not been fully explored due to an early technological development cycle of such combinations and/or integrations currently. Therefore, a unique opportunity for novel and inventive applications exists in this technological segment.

An interesting device application which may materialize upon proliferation of integrated miniaturized projectors is projection-oriented gaming for wireless communication devices, especially for cellular phones. In the past, several cellular phone manufacturers attempted to create a loyal consumer base of portable gamers on cellular phones based on network multi-playability over cellular networks. Nokia's N-Gage models, for example, combined a conventional telephone interface with game-related controls. Some N-Gage models combined directional control and/or fire buttons with cellular phone buttons and interfaces, which often had dual purposes for gaming and conventional voice or text-related communications.

However, these existing game-interface cellular phones largely failed to get market traction, in part because of awkward shapes of dual-purpose interfaces and other ergonomic-related factors reduced the appeal of such cellular phone models as gaming devices, compared to dedicated portable gaming devices such as Nintendo's Game Boy models. Furthermore, the existing game-interface cellular phones such as N-Gage relied on attached small-screen displays for gaming, which made such game-interface cellular phones impractical competitors to dedicated gaming consoles and portable personal computers (PC's) such as laptop and "netbook" computers with more flexible screen sizes. Therefore, a novel apparatus and a method which uniquely utilize a dedicated game interface in a wireless communication device with integrated projector capability may be highly beneficial in some wireless communication devices in the future.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an apparatus for a game interface on a wireless communication device with projector capability is disclosed. This apparatus comprises an integrated projector lens configured to project a desired image on a wall or a projection screen, wherein the integrated projector lens is exposed from a casing of the wireless communication device; and a hardware and/or software module configured to adjust a current orientation of the desired image before the desired image is projected from the integrated projector lens for a corrected orientation of the desired image to the wall or the projection screen, wherein the adjustment of the current orientation to the corrected orientation of the desired image may be necessary depending on a frontal surface, a rear surface, and/or another surface usage of the wireless communication device by a user.

Furthermore, in another embodiment of the invention, an apparatus for a game interface on a wireless communication device with projector capability is disclosed. This apparatus comprises a projector lens configured to project a desired image on a wall or a projection screen, wherein the projector lens is part of a projector body operatively connected to the wireless communication device and wherein the projector body is configured to extend from, retract to, or dock with a casing of a wireless communication device; and a dedicated game interface operatively attached to a surface of the wireless communication device, wherein the dedicated game interface comprises at least one directional control and a fire button.

Yet in another embodiment of the invention, a method for using a dedicated game interface on a wireless communication device with projector capability is disclosed. This method comprises executing a first game software resident in the wireless communication device or executing a second game software operated by a game-hosting entity communicating with the wireless communication device; enabling an integrated projector on a surface of the wireless communication device or enabling an extendable and retractable projector from the wireless communication device for projection of game-related graphics on a wall or a projection screen; receiving a game-related user input from a dedicated game interface comprising a directional control and one or more fire buttons, wherein the dedicated game interface is located on a surface of the wireless communication device; and projecting the game-related graphics on the wall or the projection screen from the integrated projector on the surface of the wireless communication device, or from the extendable and retractable projector from the wireless communication device, wherein the game-related graphics incorporate the game-related user input from the dedicated game interface.

DETAILED DESCRIPTION

Figure 1:
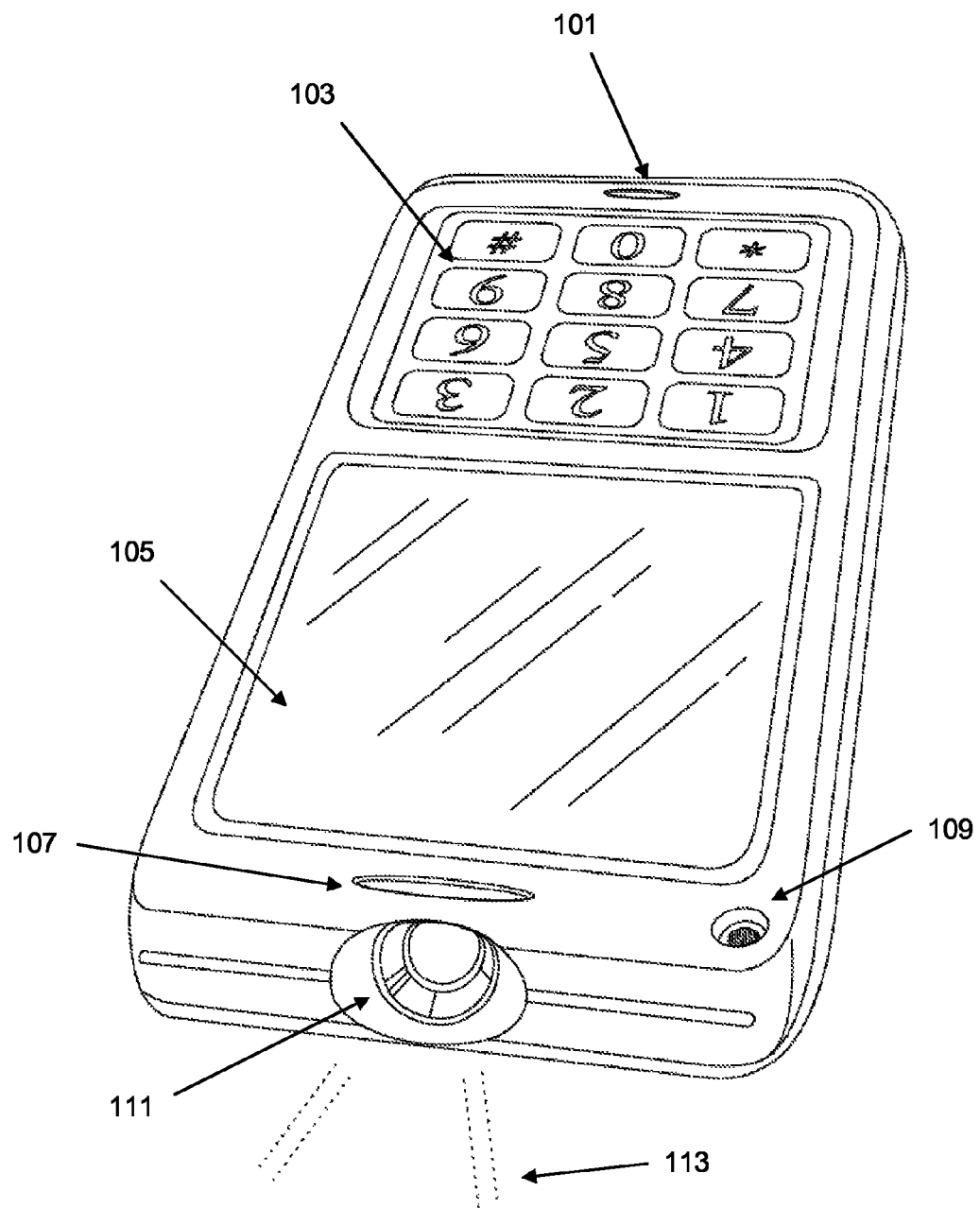
FIG. 1 shows a perspective frontal surface view of a wireless communication device (e.g. a cellular phone) with an integrated projector lens and a dedicated game interface, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more apparatuses and methods for using a dedicated game interface on a wireless communication device with projector capability. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order and do not imply any limitations in the invention.

One objective of the present invention is to provide a dedicated game interface operatively attached to a surface of a wireless communication device which integrates a miniaturized projector. In one embodiment of an integrated miniaturized projector, the integrated miniaturized projector attached to the wireless communication device may contain an integrated projector lens exposed from a casing of the wireless communication device. In another embodiment of the integrated miniaturized projector, the integrated miniaturized projector attached to the wireless communication device may be extended from or retracted into a casing of the wireless communication device. Yet in another embodiment, a miniaturized projector may simply be docked into a wireless communication device which has a dedicated game interface.

Furthermore, another objective of the invention is to provide a hardware and/or software module configured to invert, adjust, and/or re-orient a desired image before a corrected orientation of the desired image is projected from a miniaturized projector with a correct or corrected orientation of the desired image. In a preferred embodiment of the invention, the inversion of the desired image may be necessary depending on a frontal surface or a rear surface usage of the wireless communication device by a user, while the miniaturized projector is operating from a casing of a wireless communication device.

Yet, another objective of the invention is to provide a method for using a dedicated game interface on a wireless communication device with projector capability. In a preferred embodiment of the invention, the dedicated game interface is on a separate surface from a conventional user input interface such as a numeric keypad, and the dedicated game interface typically contains at least a directional control and a fire button. Optionally, the dedicated game interface may also combine or integrate an alphabetical keyboard.

For the purpose of describing the invention, a term "miniaturized projector" is defined as a highly-portable projector which can be integrated into a casing of a wireless communication device. One example of integration is an embedded miniaturized projector with an integrated projector lens exposed from the casing of the wireless communication device. Another example of integration is a retractable and/or detachable miniaturized projector which has a projector body configured to extend from, retract to, or dock with a casing of a wireless communication device.

Furthermore, for the purpose of describing the invention, a term "projector lens" is defined as an optical lens configured to project a desired image on a wall or a projection screen, wherein the projector lens is typically exposed from a casing of a wireless communication device, or wherein the projector lens is part of a projector body configured to extend from, retract to, or dock with a casing of the wireless communication device.

Moreover, for the purpose of describing the invention, a term "dedicated game interface" is defined as a user interface with at least one directional control and a fire button. Typically, a dedicated game interface is separate from other user input interfaces for a wireless communication device, such as numeric keypads used for calling another entity. In a preferred embodiment of the invention, a dedicated game interface is on a rear surface of a wireless communication device, whereas a numeric keypad is on a front surface of the wireless communication device.

In addition, for the purpose of describing the invention, a term "wireless communication device" is defined as a portable electronic device configured to transmit and receive data wirelessly. Examples of wireless communication devices include, but are not limited to, a cellular phone, a portable computer with wireless LAN or broadband wireless access capabilities, and an portable game device with wireless access capabilities.

FIG. 1 shows a perspective frontal surface view of a wireless communication device (e.g. a cellular phone) (100) with an integrated projector lens (111) and a dedicated game interface on a rear surface of the wireless communication device (100), in accordance with an embodiment of the invention. In one embodiment of the invention, the integrated projector lens (111) is part of a miniaturized projector unit embedded inside a casing of the wireless communication device (100). The wireless communication device (100) as shown in FIG. 1 also has a display screen (105), a numeric keypad (103), a microphone (101), an earpiece (107), and a camera lens (109)

on its front surface. Different embodiments of the invention may exclude one or more of these elements (e.g. 101, 103, 105, 107, and 109).

In a preferred embodiment of the invention, a miniaturized projector unit embedded in a casing of the wireless communication device (100) may utilize digital light processing (DLP) technology and a light-emitting diode (LED) light source. The integrated projector lens (111) is configured to project a desired image on a wall or a projection screen, and projector-related light rays (113) are illustrated by perforated lines. In the preferred embodiment of the invention, the dedicated game interface is located on a rear surface of the wireless communication device (100), as different embodiments of this preferred embodiment are shown in FIGS. 2~5.

Continuing with FIG. 1, the wireless communication device (100) also contains a hardware and/or software module configured to invert, adjust, and/or re-orient a desired image before a corrected orientation of the desired image is projected from the integrated projector lens (111) with the correct orientation of the desired image projected to a wall or a projection screen. For example, if a user is using a dedicated game interface on a rear surface of the wireless communication device (100) with its front surface down, as shown in FIGS. 2~5, then a projected image from the integrated projector lens (111) may need to be an inverted image of a front-surface orientation of the integrated projector lens (111). Typically, a front-surface orientation and a rear-surface orientation is rotated by 180 degrees (i.e. a full image inversion). In certain instances, the image re-orientation and/or adjustment may be less or greater than 180 degrees, depending on which surface of the wireless communication device (100) a user is currently using while projecting images from the integrated projector lens (111).

In a preferred embodiment of the invention, the hardware and/or software module is capable of determining a necessary orientation adjustment for a projected image from the integrated projector lens based on conditional logic and/or position sensors. The hardware and/or software module is also capable of automatically adjusting image orientations before a correctly-oriented image for projection reaches the integrated projector lens (111). Furthermore, in the preferred embodiment of the invention, a position sensor or a gyroscopic sensor may be operatively connected to the hardware and/or software module to derive a threshold point for inverting the desired image from a miniaturized projector contained in the casing of the wireless communication device (100). In another embodiment of the invention, a conditional logic may simply detect whether the miniaturized projector is currently in active mode and also detect whether a front surface or a rear surface of the wireless communication device is used.

Then, depending on the front surface or the rear surface usage of the wireless communication device, the hardware and/or software module may re-orient a desired image before it is projected from the miniaturized projector embedded in the wireless communication device (100). For example, when a user is punching a digit on the numerical keypad (103), the hardware and/or software module may optionally perform any necessary adjustments to project an upright image. Then, if the user flips the wireless communication device (100) to its rear surface and begins to use the dedicated game interface on the rear surface, then the hardware and/or software module can automatically adjust and/or invert the upright image projected from the miniaturized projector, which enables a correctly-oriented projection of a desired image on a wall or a projection screen.

Figure 2:
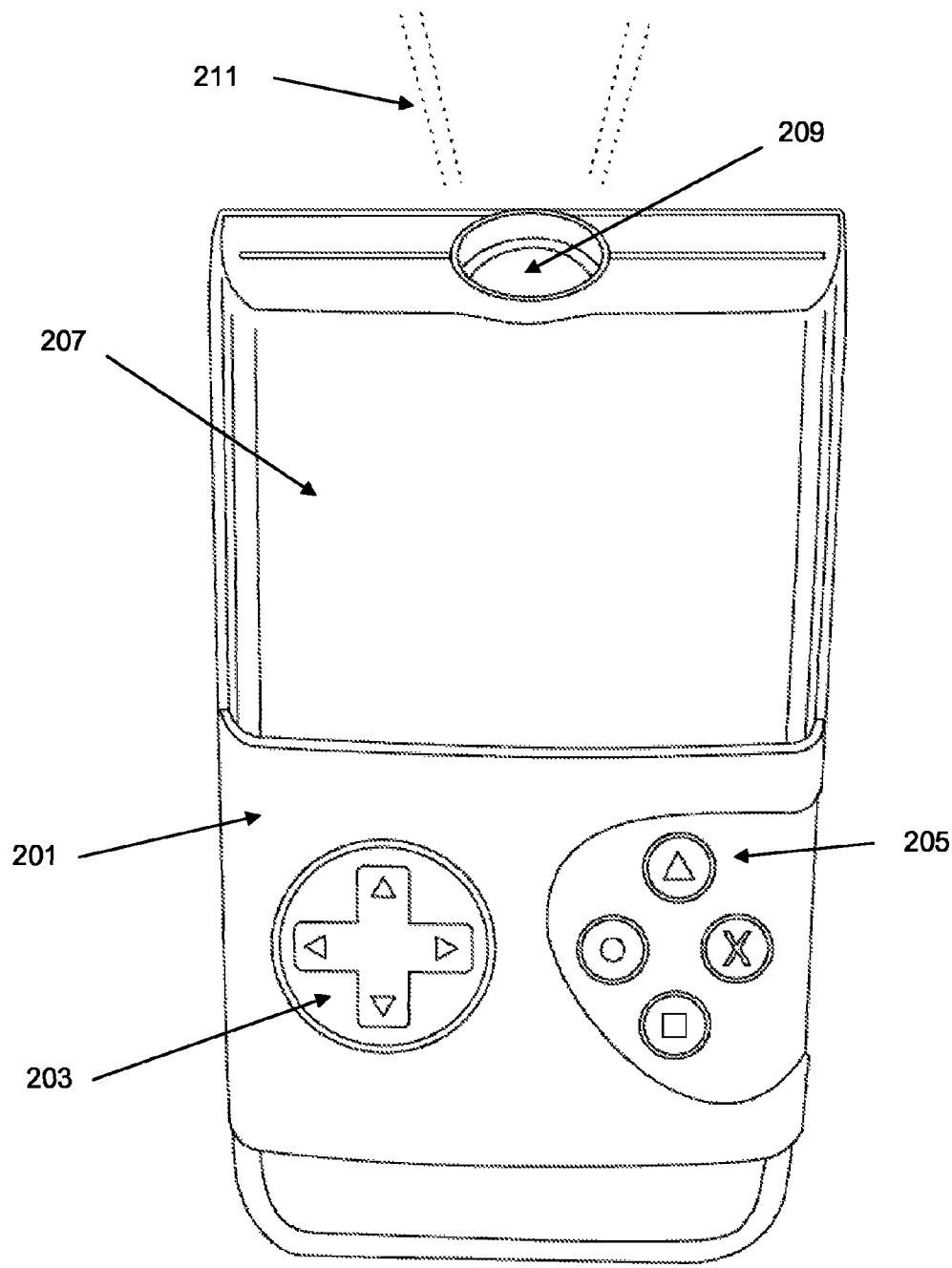
FIG. 2 shows a perspective rear surface view of a wireless communication device (e.g. a cellular phone) with an integrated projector lens and a dedicated game interface, in accordance with an embodiment of the invention.

FIG. 2 shows a perspective rear surface (207) view of a wireless communication device (e.g. a cellular phone) (200) with an integrated projector lens (209) and a dedicated game interface (201), in accordance with an embodiment of the invention. In a preferred embodiment of the invention, the dedicated game interface (201) is a "joypad" comprising at least one directional control (203) and one or more fire buttons (205). In a typical "joypad" configuration, a directional control (203) allows a user to move a character or a point of interest in multiple directions, including left, right, up, and down. Furthermore, one or more fire buttons (205) allow the character or the point of interest to take certain actions corresponding to each fire button per game software executed by the wireless communication device (200).

As an option, the dedicated game interface (201) may be operated with a sliding mechanism which enables the dedicated game interface (201) to move up, down, and/or sideways on a rear surface of the wireless communication device. The sliding mechanism may provide ergonomic advantages to users who may prefer customized positions for their dedicated game interface (201) relative to the rear surface (207). Furthermore, a game software may be executed on the wireless communication device (200) or the game software may be operated by a game-hosting entity communicating with the wireless communication device (200). In a preferred embodiment of the invention, a user typically utilizes the integrated projector lens (209) to project graphics related to the game software on a wall or a projected screen. Moreover, a game-hosting entity may enable another user of another wireless communication device to participate in a game interactively with a first user of the wireless communication device via a wireless communication network.

In a preferred embodiment of the invention, a miniaturized projector unit embedded in a casing of the wireless communication device (200) may utilize digital light processing (DLP) technology and a light-emitting diode (LED) light source. The integrated projector lens (209) is configured to project a desired image on a wall or a projection screen, and projector-related light rays (211) are illustrated by perforated lines. As shown in FIG. 2, the dedicated game interface (201) is preferably located on a rear surface of the wireless communication device (200). The wireless communication device (200) also contains a hardware and/or software module configured to invert, adjust, and/or re-orient a desired image before it is projected from the integrated projector lens (209) with a correct orientation of the desired image projected to a wall or a projection screen. For example, if a user is using the dedicated game interface (201) on the rear surface (207) of the wireless communication device (200) with its front surface down, then a projected image from the integrated projector lens (209) may need to be an inverted image of a front-surface orientation of the integrated projector lens (209). Typically, a front-surface orientation and a rear-surface orientation is rotated by 180 degrees (i.e. a full image inversion). In certain instances, the image re-orientation may require more or less than 180 degree adjustments, depending on which surface of the wireless communication device (200) a user is currently using while projecting images from the integrated projector lens (209).

In a preferred embodiment of the invention, the hardware and/or software module is capable of determining a necessary orientation adjustment for a projected image from the integrated projector lens based on conditional logic and/or position sensors. The hardware and/or software module is also capable of automatically adjusting image orientations before a correctly-oriented image for projection reaches the integrated projector lens (209). Furthermore, in the preferred embodiment of the invention, a position sensor or a gyroscopic sensor may be operatively connected to the hardware and/or software module to derive a threshold point for inverting the desired image from a miniaturized projector contained in the casing of the wireless communication device (200). In another embodiment of the invention, a conditional logic may simply detect whether the miniaturized projector is currently in active mode and also detect whether a front surface or a rear surface of the wireless communication device is used.

Then, depending on the front surface or the rear surface usage of the wireless communication device, the hardware and/or software module may re-orient a desired image before it is projected from the miniaturized projector embedded in the wireless communication device (200). For example, when a user is pressing a button or a key on a front surface of the wireless communication device (200), the hardware and/or software module can perform any necessary adjustments to project an upright image relative to front-surface orientation. Then, if the user flips the wireless communication device (200) to its rear surface (207) and begins to use the dedicated game interface (201) on the rear surface, then the hardware and/or software module can automatically adjust and/or invert the upright image projected from the miniaturized projector, which enables a correctly-oriented projection of a desired image relative from the integrated projector lens (209).

Figure 3:
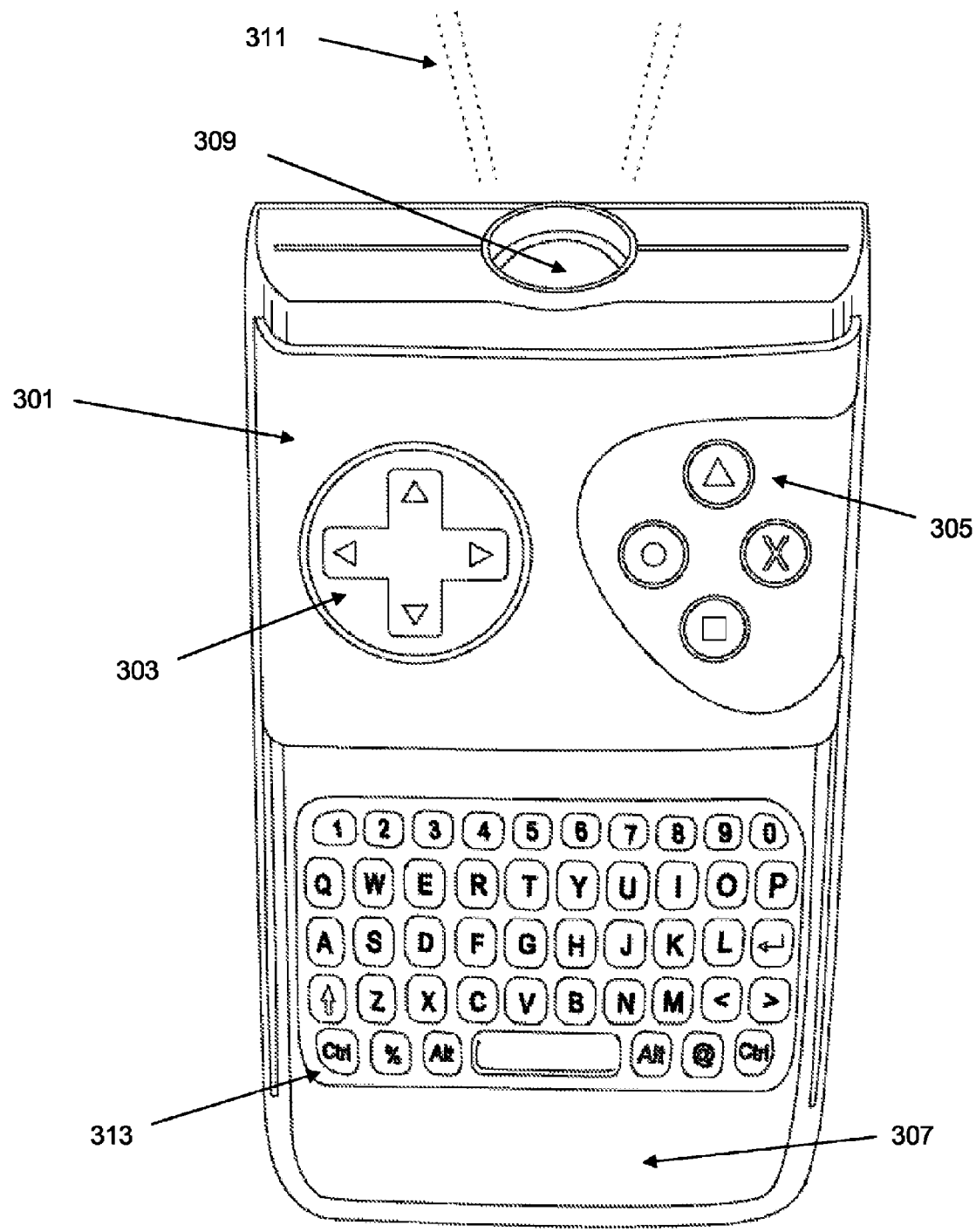
FIG. 3 shows a perspective rear surface view of a wireless communication device (e.g. a cellular phone) with an integrated projector lens and a dedicated game interface, in accordance with another embodiment of the invention.

FIG. 3 shows a perspective rear surface view of a wireless communication device (e.g. a cellular phone) (300) with an integrated projector lens (309), a dedicated game interface (301), and a QWERTY keyboard (313), in accordance with another embodiment of the invention. In a preferred embodiment of the invention, the dedicated game interface (301) is a "joypad" comprising at least one directional control (303) and one or more fire buttons (305). In a typical "joypad" configuration, a directional control (303) allows a user to move a character or a point of interest in multiple directions, including left, right, up, and down. Furthermore, one or more fire buttons (305) allow the character or the point of interest to take certain actions corresponding to each fire button per game software executed by the wireless communication device (300). In addition, the QWERTY keyboard (313) may be located below the directional control (303) as shown in FIG. 3, or above the directional control (303) in another embodiment. In one embodiment of the invention, the QWERTY keyboard (313) may be utilized for a game software during game play, for word-processing functions in a business software application, and typing text messages to another electronic device.

As an option, the dedicated game interface (301) may be operated with a sliding mechanism which enables the dedicated game interface (301) to move up, down, and/or sideways on a rear surface of the wireless communication device. The sliding mechanism may provide ergonomic advantages to users who may prefer customized positions for their dedicated game interface (301) relative to the rear surface (307). For example, in the embodiment of the invention as shown in FIG. 3, the dedicated game interface (301) may slide down to overlap the QWERTY keyboard (313) partially or completely, depending on a user preference during use of the dedicated game interface (301). Furthermore, a game software may be executed on the wireless communication device (300) or the game software may be operated by a game-hosting entity communicating with the wireless communication device (300). In a preferred embodiment of the invention, a user typically utilizes the integrated projector lens (309) to project graphics related to the game software on a wall or a projected screen. Moreover, a game-hosting entity may enable another user of another wireless communication device to participate in a game interactively with a first user of the wireless communication device via a wireless communication network.

In a preferred embodiment of the invention, a miniaturized projector unit embedded in a casing of the wireless communication device (300) may utilize digital light processing (DLP) technology and a light-emitting diode (LED) light source. The integrated projector lens (309) is configured to project a desired image on a wall or a projection screen, and projector-related light rays (311) are illustrated by perforated lines. As shown in FIG. 3, the dedicated game interface (301) is preferably located on a rear surface of the wireless communication device (300). The wireless communication device (300) also contains a hardware and/or software module configured to invert, adjust, and/or re-orient a desired image before it is projected from the integrated projector lens (309) with a correct orientation of the desired image projected to a wall or a projection screen. For example, if a user is using the dedicated game interface (301) on the rear surface (307) of the wireless communication device (300) with its front surface down, then a projected image from the integrated projector lens (309) may need to be an inverted image of a front-surface orientation of the integrated projector lens (309). Typically, a front-surface orientation and a rear-surface orientation is rotated by 180 degrees (i.e. a full image inversion). In certain instances, the image re-orientation may require more or less than 180 degree adjustments, depending on which surface of the wireless communication device (300) a user is currently using while projecting images from the integrated projector lens (309).

In a preferred embodiment of the invention, the hardware and/or software module is capable of determining a necessary orientation adjustment for a projected image from the integrated projector lens based on conditional logic and/or position sensors. The hardware and/or software module is also capable of automatically adjusting image orientations before a correctly-oriented image for projection reaches the integrated projector lens (309). Furthermore, in the preferred embodiment of the invention, a position sensor or a gyroscopic sensor may be operatively connected to the hardware and/or software module to derive a threshold point for inverting the desired image from a miniaturized projector contained in the casing of the wireless communication device (300). In another embodiment of the invention, a conditional logic may simply detect whether the miniaturized projector is currently in active mode and also detect whether a front surface or a rear surface of the wireless communication device is used.

Then, depending on the front surface or the rear surface usage of the wireless communication device, the hardware and/or software module may re-orient a desired image projected from the miniaturized projector embedded in the wireless communication device (300). For example, when a user is pressing a button or a key on a front surface of the wireless communication device (300), the hardware and/or software module can perform any necessary adjustments to project an upright image relative to front-surface orientation. Then, if the user flips the wireless communication device (300) to its rear surface (307) and begins to use the dedicated game interface (301) on the rear surface, then the hardware and/or software module can automatically adjust and/or invert the upright image projected from the miniaturized projector, which enables a correctly-oriented projection of a desired image relative from the integrated projector lens (309).

Figure 4:
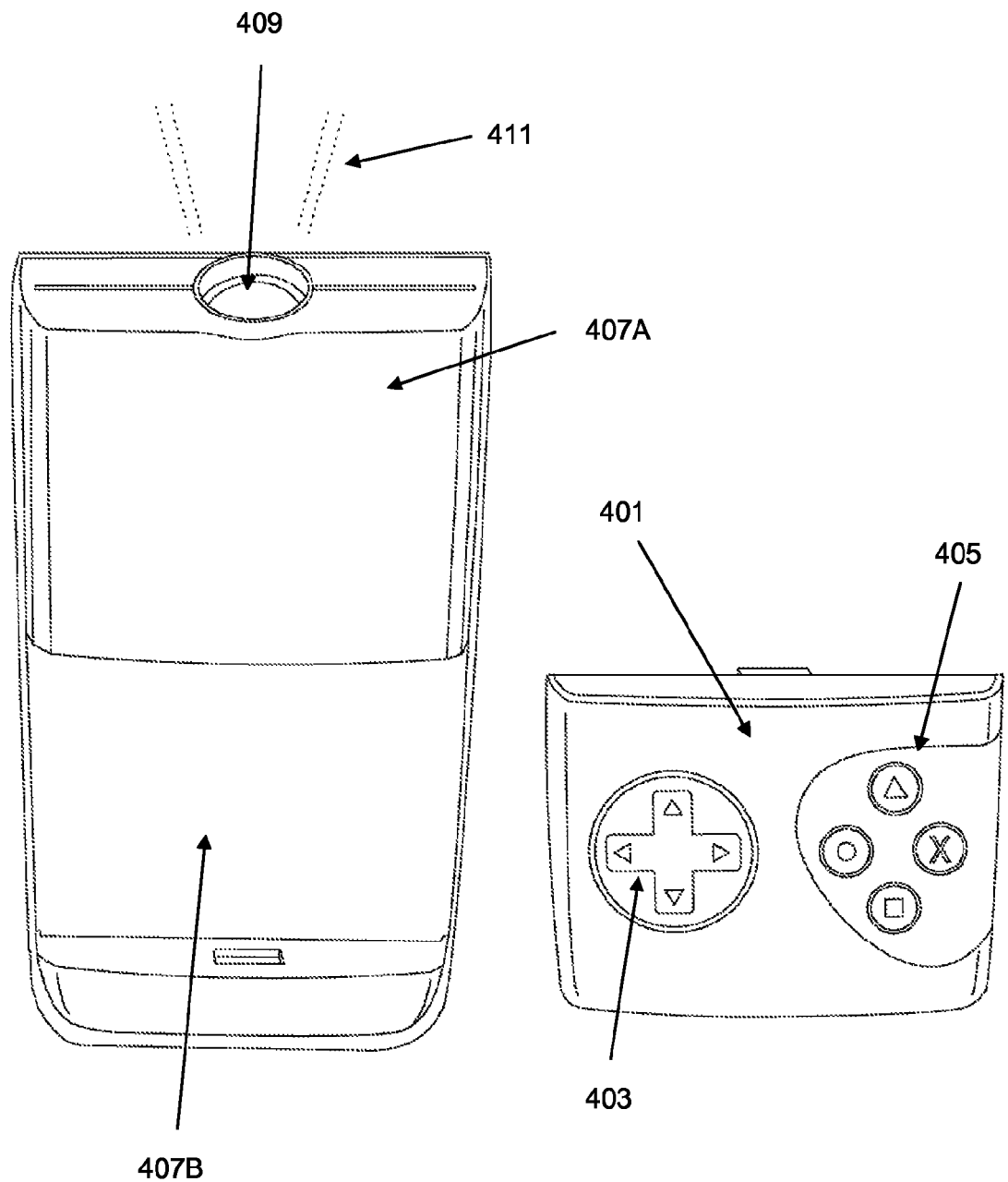
FIG. 4 shows a perspective rear surface view of a splittable dedicated game interface of a wireless communication device, in accordance with an embodiment of the invention.

FIG. 4 shows a perspective rear surface view of a splittable dedicated game interface (401) of a wireless communication device (e.g. a cellular phone) (400), in accordance with an embodiment of the invention. In a preferred embodiment of the invention, the splittable dedicated game interface (401) is a detachable "joypad" comprising at least one directional control (403) and one or more fire buttons (405). The splittable dedicated game interface (401) can be detached from a docking area (407B) and communicate with a remaining wireless communication device body with a wired connection or a wireless connection. In a preferred embodiment of the invention, the splittable dedicated game interface (401) contains a rechargeable battery source to power a wireless communication with the remaining wireless communication device body when they are detached. In a typical "joypad" configuration, a directional control (403) allows a user to move a character or a point of interest in multiple directions, including left, right, up, and down. Furthermore, one or more fire buttons (405) allow the character or the point of interest to take certain actions corresponding to each fire button per game software executed by the wireless communication device (400).

The splittable game interface (401) as shown in FIG. 4 provides several advantages. First, by separating the remaining wireless communication device body from the splittable game interface (401), an integrated projector lens (409) attached to the remaining wireless communication device body (407A, 407B) is free of potential vibrations and shakes which can be introduced when a user is playing a game using a fixed dedicated game interface (201, 301) shown in other embodiments shown in FIGS. 2-3. Second, a user can move away from a miniaturized projector for a comfortable viewing position by separating a game interface unit (e.g. 401) from a wireless communication device (400). The detachability of the splittable game interface (401) from a projection source (e.g. 409) embedded in the remaining wireless communication device body creates an effect of using the wireless communication device (400) as if it is a standalone game console, such as Play Station or Xbox. The integrated projection capability of the wireless communication device (400) allows a user to utilize a large-size projected images for game play, while a wireless dedicated game interface (e.g. 401) gives the user a freedom to sit back or move around.

Furthermore, a game software may be executed on the wireless communication device (400) or the game software may be operated by a game-hosting entity communicating with the wireless communication device (400). In a preferred embodiment of the invention, a user typically utilizes the integrated projector lens (409) to project graphics related to the game software on a wall or a projected screen. Moreover, a game-hosting entity may enable another user of another wireless communication device to participate in a game interactively with a first user of the wireless communication device via a wireless communication network. Examples for the wireless communication network include, but are not limited to, a cellular network, a wireless LAN, a broadband wireless access network, and a satellite communication network.

In a preferred embodiment of the invention, a miniaturized projector unit embedded in a casing of the wireless communication device (400) may utilize digital light processing (DLP) technology and a light-emitting diode (LED) light source. The integrated projector lens (409) is configured to project a desired image on a wall or a projection screen, and projector-related light rays (411) are illustrated by perforated lines. As shown in FIG. 4, the splittable dedicated game interface (401) is preferably located on a rear surface (407A, 407B) when it is docked with the rest of the wireless communication device (400). In the preferred embodiment of the invention, if the splittable dedicated game interface (401) is detached from a remaining wireless communication device body (e.g. 407A, 407B), the splittable dedicated game interface (401) is able to relay user inputs from a directional control (403), a fire button (405), and/or any other input means on the splittable game interface (401) to the remaining wireless communication device body (e.g. 407A, 407B).

Furthermore, in one embodiment of the invention, a docking area (407B) contains an anchor or a latch mechanism to enable the splittable game interface (401) to dock into the docking area (407B) of the wireless communication device (400). The docking area (407B) may also contain one or more electrical contacts to allow battery recharging and data transfer between the splittable game interface (401) and the rest of the wireless communication device (400). The wireless communication device (400) may also contain a hardware and/or software module configured to invert, adjust, and/or re-orient a desired image before it is projected from the integrated projector lens (409) for a correct orientation of the desired image projected to a wall or a projection screen. The hardware and/or software module for image inversions based on a front surface or a rear surface usage of the wireless communication device (400) may be nearly identical or similar to what has been described for other embodiments of the invention in FIGS. 2-3.

Figure 5:
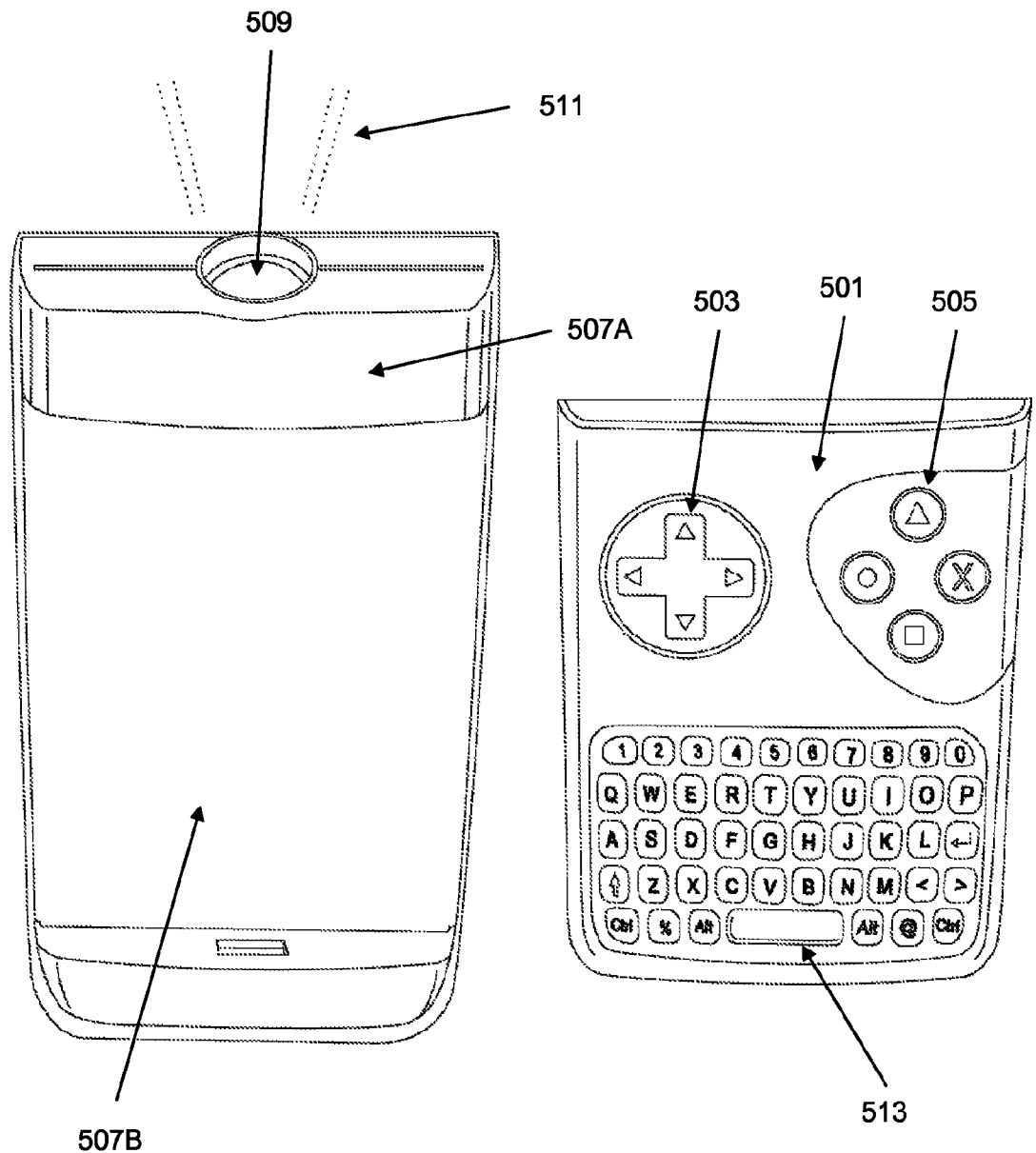
FIG. 5 shows a perspective rear surface view of a splittable dedicated game interface of another wireless communication device, in accordance with an embodiment of the invention.

FIG. 5 shows a perspective rear surface view of a splittable dedicated game interface (501) with a keyboard (513) for a wireless communication device (e.g. a cellular phone) (500), in accordance with another embodiment of the invention. In one embodiment of the invention, a QWERTY keyboard (513), which is part of the splittable dedicated game interface (501), may be utilized for a game software during game play, for word-processing functions in a business software application, and typing text messages to another electronic device. In a preferred embodiment of the invention, the splittable dedicated game interface (501) is a detachable "joypad" comprising at least one directional control (503), one or more fire buttons (505), and a QWERTY keyboard (513). The splittable dedicated game interface (501) can be detached from a docking area (507B) for splittable game interface and communicate with a remaining wireless communication device body (507A, 507B) with a wired connection or a wireless connection.

In a preferred embodiment of the invention, the splittable dedicated game interface (501) contains a rechargeable battery source to power a wireless communication with the remaining wireless communication device body when they are detached. In a typical "joypad" configuration, a directional control (503) allows a user to move a character or a point of interest in multiple directions, including left, right, up, and down. Furthermore, one or more fire buttons (505) allow the character or the point of interest to take certain actions corresponding to each fire button per game software executed by the wireless communication device (500).

The splittable game interface (501) as shown in FIG. 5 provides several advantages. First, by separating the remaining wireless communication device body (e.g. 507A, 507B) from the splittable game interface (501), an integrated projector lens (509) attached to the remaining wireless communication device body (e.g. 507A, 507B) is free of potential vibrations and shakes which can be introduced when a user is playing a game using a fixed dedicated game interface (201, 301) shown in other embodiments shown in FIGS. 2-3. Second, a user can move away from a miniaturized projector for a comfortable viewing position by separating a game interface unit (e.g. 501) from a wireless communication device (500). The detachability of the splittable game interface (501) from a projection source (e.g. 509) embedded in the remaining wireless communication device body creates an effect of using the wireless communication device (500) as if it is a standalone game console, such as Play Station or Xbox. The integrated projection capability of the wireless communication device (500) allows a user to utilize a large-size projected images for game play, while a wireless dedicated game interface (e.g. 501) gives the user a freedom to sit back or move around.

Furthermore, a game software may be executed on the wireless communication device (500) or the game software may be operated by a game-hosting entity communicating with the wireless communication device (500). In a preferred embodiment of the invention, a user typically utilizes the integrated projector lens (509) to project graphics related to the game software on a wall or a projected screen. Moreover, a game-hosting entity may enable another user of another wireless communication device to participate in a game interactively with a first user of the wireless communication device via a wireless communication network. Examples for the wireless communication network include, but are not limited to, a cellular network, a wireless LAN, a broadband wireless access network, and a satellite communication network.

In a preferred embodiment of the invention, a miniaturized projector unit embedded in a casing of the wireless communication device (500) may utilize digital light processing (DLP) technology and a light-emitting diode (LED) light source. The integrated projector lens (509) is configured to project a desired image on a wall or a projection screen, and projector-related light rays (511) are illustrated by perforated lines. As shown in FIG. 5, the splittable dedicated game interface (501) is preferably located on a rear surface (507A, 507B) when it is docked with the rest of the wireless communication device (500). In the preferred embodiment of the invention, if the splittable dedicated game interface (501) is detached from a remaining wireless communication device body (e.g. 507A, 507B), the splittable dedicated game interface (501) is able to relay user inputs from a directional control (503), a fire button (505), and/or any other input means on the splittable game interface (501) to the remaining wireless communication device body (e.g. 507A, 507B). Furthermore, in one embodiment of the invention, a docking area (507B) contains an anchor or a latch mechanism to enable the splittable game interface (501) to dock into the docking area (507B) of the wireless communication device (500). The docking area (507B) may also contain one or more electrical contacts to allow battery recharging and data transfer between the splittable game interface (501) and the rest of the wireless communication device (500).

The wireless communication device (500) may also contain a hardware and/or software module configured to invert, adjust, and/or re-orient a desired image before it is projected from the integrated projector lens (509) for a correct orientation of the desired image projected to a wall or a projection screen. The hardware and/or software module for image inversions based on a front surface or a rear surface usage of the wireless communication device (500) may be nearly identical or similar to what has been described for other embodiments of the invention in FIGS. 2-3.

Figure 6:
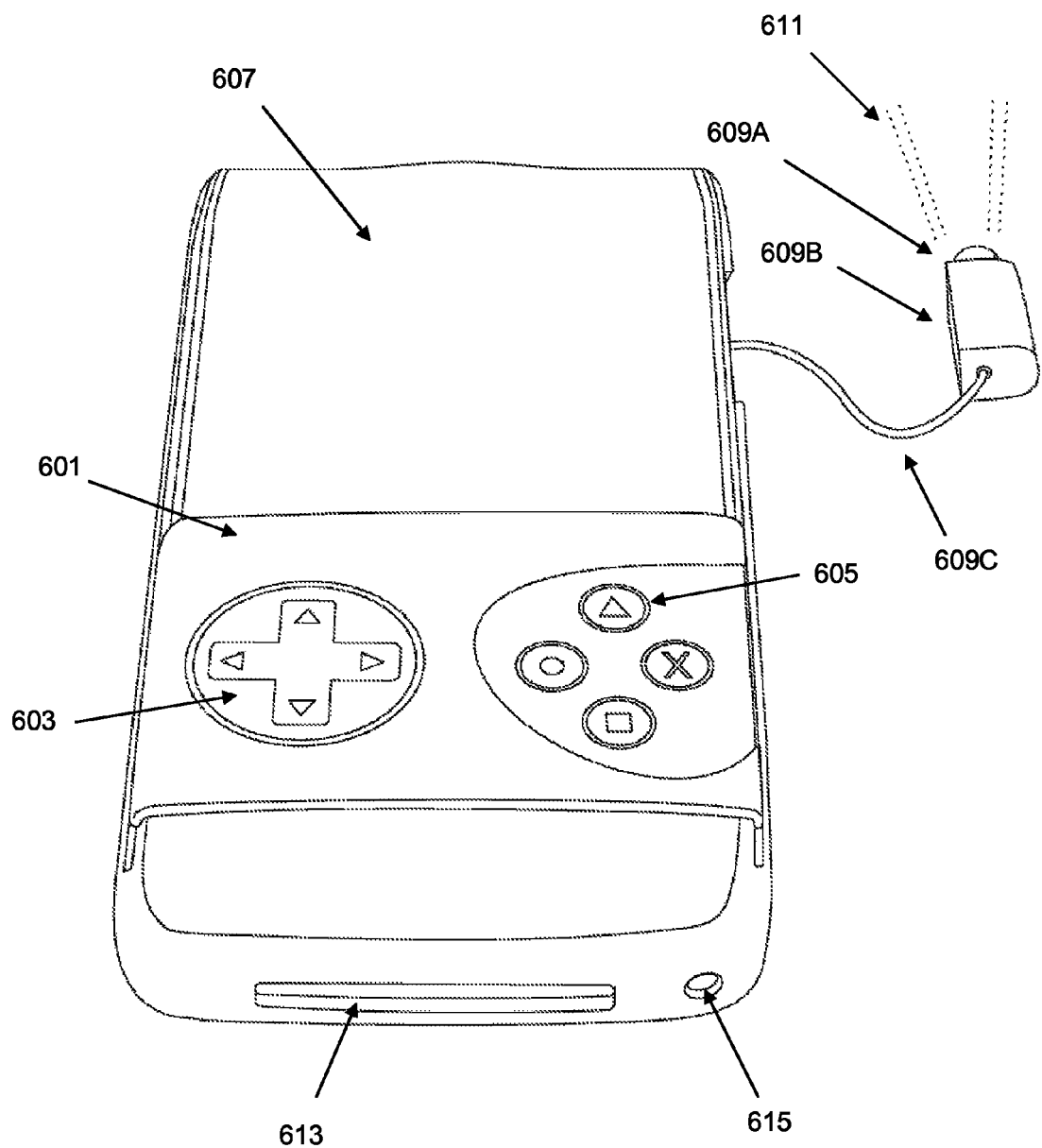
FIG. 6 shows a perspective rear surface view of a wireless communication device (e.g. a cellular phone) with a retractable projector in accordance with an embodiment of the invention.

FIG. 6 shows a perspective rear surface view of a wireless communication device (e.g. a cellular phone) (600) with a retractable projector (609A, 609B) in accordance with an embodiment of the invention. In one embodiment of the invention, a projector lens (609A) and a projector body (609B) comprises a retractable projector (609A, 609B). In one embodiment of the invention, the retractable projector (609A, 609B) is operatively connected to the wireless communication device (600) via a physical projector connection (609C). In another embodiment of the invention, the retractable projector (609A, 609B) is operatively connected to the wireless communication device (600) via a wireless connection. Furthermore, the wireless communication device (600) as shown in FIG. 6 has a first external connection (613) and a second external connection (615), wherein the first and the second external connections (613, 615) are capable of connecting external electronic devices such as a power adapter and an earphone.

In a preferred embodiment of the invention, the projector body (609B) is configured to extend from, retract to, or dock with a casing of a wireless communication device (600). For example, the projector body (608B) containing the projector lens (609A) as shown in FIG. 6 can be retracted or "snapped" into one side of the wireless communication device (600) for ease of portability. Likewise, the projector body (608B) containing the projector lens (609A) can extend from one side of the wireless communication device (600) from a retracted position. The retractable projector (609A, 609B) embodiment of the invention as shown in FIG. 6 provides a few major advantages. First, the retractable projector (609A, 609B) accommodates flexible projection positions for various angles. For example, a user can project graphics on a rear wall instead of just a front wall without changing the direction of the wireless communication device (600), if the retractable projector (609A, 609B) is in an extended position. Furthermore, any vibrations caused by user input entries or other interactions with the wireless communication device (600) are largely isolated from the retractable projector (609A, 609B).

Continuing with FIG. 6, the dedicated game interface (601) is a "joypad" comprising at least one directional control (603) and one or more fire buttons (605). In a typical "joypad" configuration, a directional control (603) allows a user to move a character or a point of interest in multiple directions, including left, right, up, and down. Furthermore, one or more fire buttons (605) allow the character or the point of interest to take certain actions corresponding to each fire button per game software executed by the wireless communication device (600). As an option, the dedicated game interface (601) may be operated with a sliding mechanism which enables the dedicated game interface (601) to move up, down, and/or sideways on a rear surface of the wireless communication device. The sliding mechanism may provide ergonomic advantages to users who may prefer customized positions for their dedicated game interface (601) relative to the rear surface (607).

Furthermore, a game software may be executed on the wireless communication device (600) or the game software may be operated by a game-hosting entity communicating with the wireless communication device (600). In a preferred embodiment of the invention, a user typically utilizes the projector lens (609A) exposed from the projector body (609B) to project graphics related to the game software on a wall or a projected screen. Moreover, a game-hosting entity may enable another user of another wireless communication device to participate in a game interactively with a first user of the wireless communication device via a wireless communication network. Furthermore, in a preferred embodiment of the invention, a miniaturized projector unit embedded in a projector body (609B) may utilize digital light processing (DLP) technology and a light-emitting diode (LED) light source. The projector lens (609A) is configured to project a desired image on a wall or a projection screen, and projector-related light rays (611) are illustrated by perforated lines.

Continuing with FIG. 6, the dedicated game interface (601) is preferably located on a rear surface (607) of the wireless communication device (600). The wireless communication device (600) also contains a hardware and/or software module configured to invert, adjust, and/or re-orient a desired image before it is projected from the projector lens (609A) for a correct orientation of the desired image projected to a wall or a projection screen. For example, if a user is using the dedicated game interface (601) on the rear surface (607) of the wireless communication device (600) with its front surface down, then a projected image from the projector lens (609A) may need to be an inverted image of a front-surface orientation of the projector lens (609A). Typically, a front-surface orientation and a rear-surface orientation is rotated by 180 degrees (i.e. a full image inversion). In certain instances, the image re-orientation may require more or less than 180 degree adjustments, depending on which surface of the wireless communication device (600) a user is currently using while projecting images from the projector lens (609A).

In a preferred embodiment of the invention, the hardware and/or software module is capable of determining a necessary orientation adjustment for a projected image from the projector lens based on conditional logic and/or position sensors. The hardware and/or software module is also capable of automatically adjusting image orientations before a correctly-oriented image for projection reaches the projector lens (609A). Furthermore, in the preferred embodiment of the invention, a position sensor or a gyroscopic sensor may be operatively connected to the hardware and/or software module to derive a threshold point for inverting the desired image from a miniaturized projector contained in the casing of the wireless communication device (600). In another embodiment of the invention, a conditional logic may simply detect whether the miniaturized projector is currently in active mode and also detect whether a front surface or a rear surface of the wireless communication device is used.

Then, depending on the front surface or the rear surface usage of the wireless communication device, the hardware and/or software module may re-orient a desired image projected from the miniaturized projector embedded in the wireless communication device (600). For example, when a user is pressing a button or a key on a front surface of the wireless communication device (600), the hardware and/or software module can perform any necessary adjustments to project an upright image relative to front-surface orientation. Then, if the user flips the wireless communication device (600) to its rear surface (607) and begins to use the dedicated game interface (601) on the rear surface, then the hardware and/or software module can automatically adjust and/or invert the upright image projected from the miniaturized projector, which enables a correctly-oriented projection of a desired image relative from the projector lens (609A).

Figure 7:
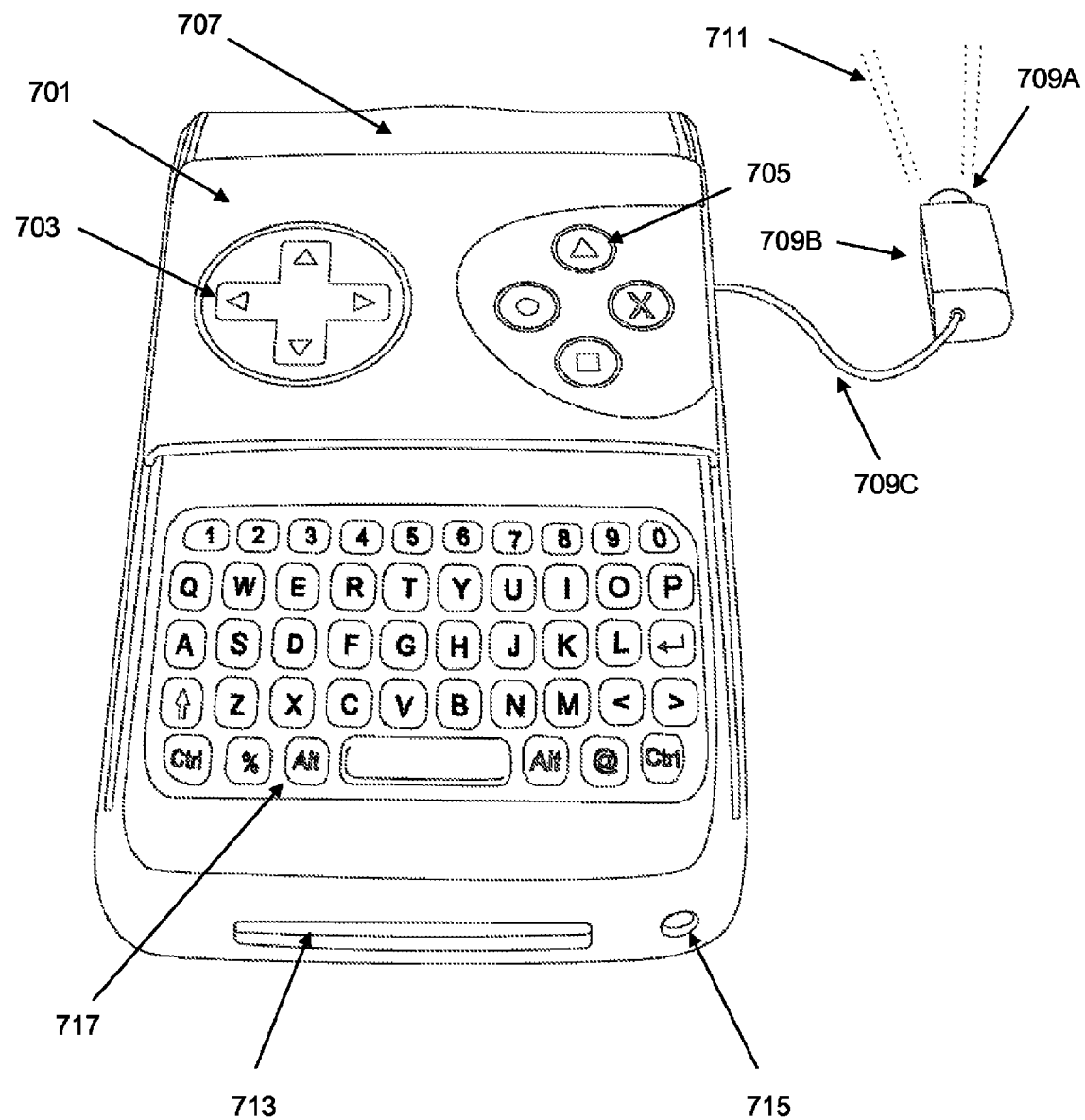
FIG. 7 shows a perspective rear surface view of a wireless communication device (e.g. a cellular phone) with a retractable projector in accordance with an embodiment of the invention.

FIG. 7 shows a perspective rear surface view of a wireless communication device (e.g. a cellular phone) (700) with a retractable projector (709A, 709B) in accordance with an embodiment of the invention. In one embodiment of the invention, a projector lens (709A) and a projector body (709B) comprise a retractable projector (709A, 709B). In one embodiment of the invention, the retractable projector (709A, 709B) is operatively connected to the wireless communication device (700) via a physical projector connection (709C). In another embodiment of the invention, the retractable projector (709A, 709B) is operatively connected to the wireless communication device (700) via a wireless connection. Furthermore, the wireless communication device (700) as shown in FIG. 7 has a first external connection (713) and a second external connection (715), wherein the first and the second external connections (713, 715) are capable of connecting external electronic devices such as a power adapter and an earphone.

In a preferred embodiment of the invention, the projector body (709B) is configured to extend from, retract to, or dock with a casing of a wireless communication device (700). For example, the projector body (708B) containing the projector lens (709A) as shown in FIG. 7 can be retracted or "snapped" into one side of the wireless communication device (700) for ease of portability. Likewise, the projector body (708B) containing the projector lens (709A) can extend from one side of the wireless communication device (700) from a retracted position. The retractable projector (709A, 709B) embodiment of the invention as shown in FIG. 7 provides a few major advantages. First, the retractable projector (709A, 709B) accommodates flexible projection positions for various angles. For example, a user can project graphics on a rear wall instead of just a front wall without changing the direction of the wireless communication device (700), if the retractable projector (709A, 709B) is in an extended position. Furthermore, any vibrations caused by user input entries or other interactions with the wireless communication device (700) are largely isolated from the retractable projector (709A, 709B).

Continuing with FIG. 7, the dedicated game interface (701) is a "joypad" comprising at least one directional control (703), one or more fire buttons (705), and a keyboard (717). In a typical "joypad" configuration, a directional control (703) allows a user to move a character or a point of interest in multiple directions, including left, right, up, and down. Furthermore, one or more fire buttons (705) allow the character or the point of interest to take certain actions corresponding to each fire button per game software executed by the wireless communication device (700). Furthermore, the keyboard (717) on the rear surface (707) of the wireless communication device can be used as a user input entry during game play, business applications, text messaging, and/or other activities. As an option, the dedicated game interface (701) may be operated with a sliding mechanism which enables the dedicated game interface (701) to move up, down, and/or sideways on a rear surface of the wireless communication device. The sliding mechanism may provide ergonomic advantages to users who may prefer customized positions for their dedicated game interface (701) relative to the rear surface (707).

Furthermore, a game software may be executed on the wireless communication device (700) or the game software may be operated by a game-hosting entity communicating with the wireless communication device (700). In a preferred embodiment of the invention, a user typically utilizes the projector lens (709A) exposed from the projector body (709B) to project graphics related to the game software on a wall or a projected screen. Moreover, a game-hosting entity may enable another user of another wireless communication device to participate in a game interactively with a first user of the wireless communication device via a wireless communication network. Furthermore, in a preferred embodiment of the invention, a miniaturized projector unit embedded in a projector body (709B) may utilize digital light processing (DLP) technology and a light-emitting diode (LED) light source. The projector lens (709A) is configured to project a desired image on a wall or a projection screen, and projector-related light rays (711) are illustrated by perforated lines.

Continuing with FIG. 7, the dedicated game interface (701) is preferably located on a rear surface (707) of the wireless communication device (700). The wireless communication device (700) also contains a hardware and/or software module configured to invert, adjust, and/or re-orient a desired image before it is projected from the projector lens (709A) for a correct orientation of the desired image projected to a wall or a projection screen. For example, if a user is using the dedicated game interface (701) on the rear surface (707) of the wireless communication device (700) with its front surface down, then a projected image from the projector lens (709A) may need to be an inverted image of a front-surface orientation of the projector lens (709A). Typically, a front-surface orientation and a rear-surface orientation is rotated by 180 degrees (i.e. a full image inversion). In certain instances, the image re-orientation may require more or less than 180 degree adjustments, depending on which surface of the wireless communication device (700) a user is currently using while projecting images from the projector lens (709A).

In a preferred embodiment of the invention, the hardware and/or software module is capable of determining a necessary orientation adjustment for a projected image from the projector lens based on conditional logic and/or position sensors. The hardware and/or software module is also capable of automatically adjusting image orientations before a correctly-oriented image for projection reaches the projector lens (709A). Furthermore, in the preferred embodiment of the invention, a position sensor or a gyroscopic sensor may be operatively connected to the hardware and/or software module to derive a threshold point for inverting the desired image from a miniaturized projector contained in the casing of the wireless communication device (700). In another embodiment of the invention, a conditional logic may simply detect whether the miniaturized projector is currently in active mode and also detect whether a front surface or a rear surface of the wireless communication device is used.

Then, depending on the front surface or the rear surface usage of the wireless communication device, the hardware and/or software module may re-orient a desired image projected from the miniaturized projector embedded in the wireless communication device (700). For example, when a user is pressing a button or a key on a front surface of the wireless communication device (700), the hardware and/or software module can perform any necessary adjustments to project an upright image relative to front-surface orientation. Then, if the user flips the wireless communication device (700) to its rear surface (707) and begins to use the dedicated game interface (701) on the rear surface, then the hardware and/or software module can automatically adjust and/or invert the upright image projected from the miniaturized projector, which enables a correctly-oriented projection of a desired image relative from the projector lens (709A).

Figure 8:
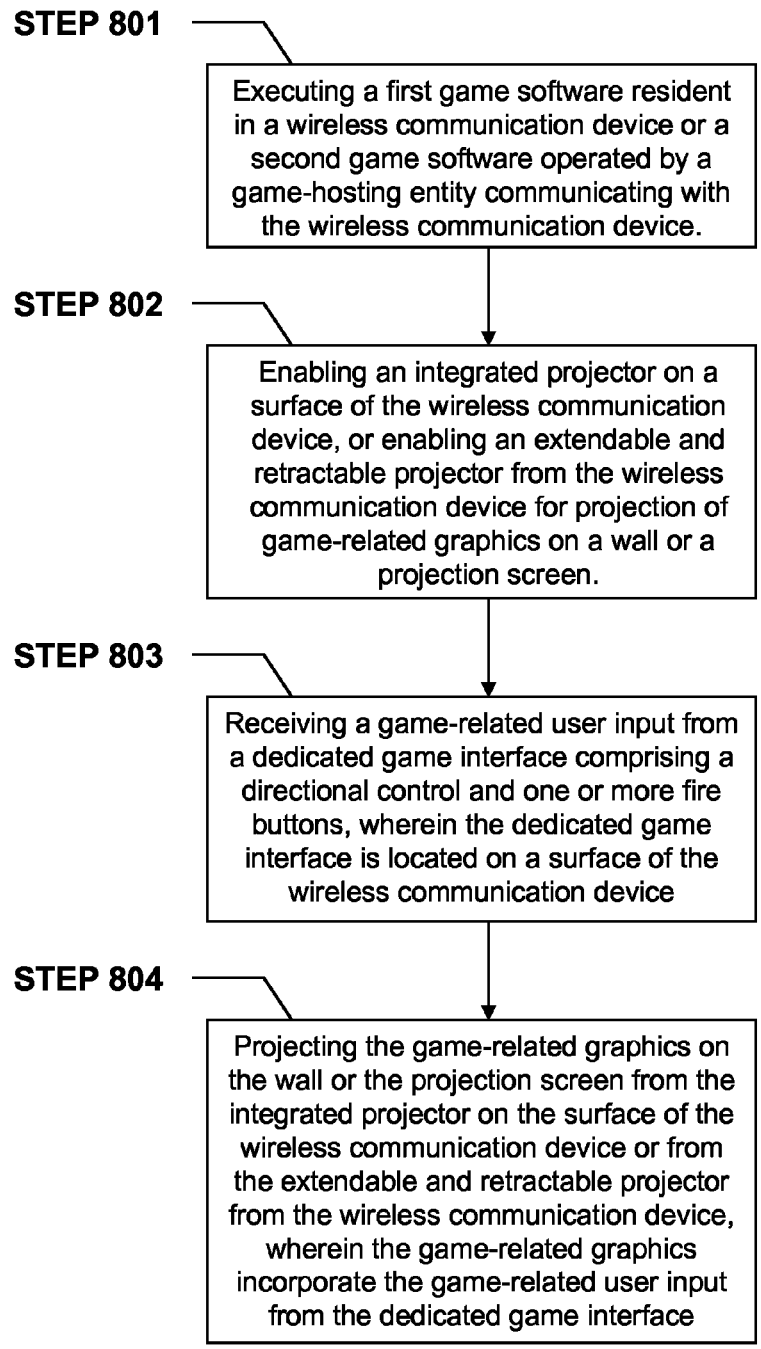
FIG. 8 shows a method for using a dedicated game interface on a wireless communication device with projector capability, in accordance with an embodiment of the invention.

FIG. 8 shows a method for using a dedicated game interface on a wireless communication device with projector capability, in accordance with an embodiment of the invention. In STEP 801, a wireless communication device executes a first game software resident in a wireless communication device or a second game software operated by a game-hosting entity communicating with the wireless communication device. Then, in STEP 802, a user instructs the wireless communication device to enable an integrated projector with a projector lens exposed from a casing of the wireless communication device, or enable an extendable/retractable projector from the wireless communication device for projection of game-related graphics on a wall or a projection screen. In STEP 803, a user issues a game-related user input to a dedicated game interface comprising a directional control and one or more fire buttons, wherein the dedicated game interface is located on a surface of the wireless communication device. The wireless communication device receives the game-related user input and incorporates it into the first game software or the second game software. Then, in STEP 804, the wireless communication device can project the game-related graphics on the wall or the projection screen from the integrated projector or from the extendable/retractable projector from the wireless communication device, wherein the game-related graphics incorporate the game-related user input from the dedicated game interface.

The present invention in various embodiments as described for FIGS. 1~8 provide several advantages. First, a unique hardware and/or software module can sense and/or determine which surface of a wireless communication device is being used and can invert and/or re-orient a desired image before it is projected from an integrated projector or a retractable/extendable projector embedded in the wireless communication device. Second, a dedicated game interface on a wireless communication device with embedded projection capability allows a user to enjoy a variety of games on the wireless communication device with a big-screen projection for game play anywhere the user carries the wireless communication device. Third, in case of the splittable dedicated game interface embodiments of the invention, a main body of the wireless communication device can function as a standalone game console box with embedded big-screen projection capability, while the splittable dedicated game interface can be used as a wireless joypad for game play when it is detached. The detached dedicated game interface also isolates vibrations and shakes introduced by the user's input into a directional control and fire buttons from a remaining portion of the wireless communication device with an embedded projector, thereby providing a convenient, portable, and mobile game-playing environment with a big projection screen.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for a game interface on a wireless communication device with projector capability, the apparatus comprising:
   a projector lens configured to project a desired image on a wall or a projection screen, wherein the projector lens is encapsulated by a retractable and extendable projector body that extends from or retracts into an exterior casing of the wireless communication device;
   a hardware and/or software module configured to adjust a previous orientation of the desired image to a corrected orientation of the desired image automatically so that the corrected orientation of the desired image is projected from the projector lens to the wall or the projection screen when a user's previous surface of information viewing or entry is rotated to a user's new surface of information viewing or entry, wherein the adjustment of the previous orientation to the corrected orientation of the desired image is a rotational adjustment with equal or nearly-equal angular magnitude in opposite rotational direction from a rotational direction and angular magnitude of the user's previous surface of information viewing or entry to the user's new surface of information viewing or entry; and
   a dedicated game interface on a sliding unit configured to move up, down, or sideways on a rear battery cover surface of the wireless communication device, wherein the dedicated game interface on the sliding unit is also configured to move to a position that overlaps a rear-face keyboard also located on the rear battery cover surface of the wireless communication device.

2. The apparatus of claim 1, wherein the dedicated game interface comprises at least one directional control and a fire button.

3. The apparatus of claim 1, further comprising a first game software configured to be executed on the wireless communication device, or a second game software configured to be operated by a game-hosting entity communicating with the wireless communication device, wherein the wireless communication device utilizes the projector lens to project graphics related to the game software on the wall or the projection screen.

4. The apparatus of claim 3, wherein the game-hosting entity enables another user of another wireless communication device to interactively participate in a game with a first user of the wireless communication device via a wireless communication device network.

5. The apparatus of claim 1, wherein the dedicated game interface is configured to split from the rear battery cover surface of the wireless communication device and communicate data with a remaining wireless communication device body with a wired connection or a wireless connection.

6. A method for using a dedicated game interface on a wireless communication device with projector capability, the method comprising:
  executing a first game software resident in the wireless communication device or executing a second game software operated by a game-hosting entity communicating with the wireless communication device;
  pulling out a retractable and extendable projector body from a retracted position in an exterior casing of the wireless communication device, so that the retractable and extendable projector body becomes a physically separated piece from the exterior casing of the wireless communication device;
  powering on the retractable and extendable projector body extended out from the wireless communication device for projection of game-related graphics on a wall or a projection screen, wherein directional and angular adjustments to the retractable and extendable projector body do not change a current position of a remainder of the wireless communication device that previously encapsulated the retractable and extendable projector in the retracted position;
  receiving a game-related user input from a dedicated game interface on a sliding unit comprising a directional control and one or more fire buttons, wherein the dedicated game interface on the sliding unit is configured to move up, down, or sideways on a rear battery cover surface of the wireless communication device to overlap a rear-face keyboard also located on the rear battery cover of the wireless communication device; and
  projecting the game-related graphics on the wall or the projection screen from the retractable and extendable projector body separated from the remainder of the wireless communication device.

7. The method of claim 6, further comprising a step of projecting the game-related graphics on the wall or the projection screen, wherein the game-related graphics further incorporate inputs from one or more networked game players via the game-hosting entity for the second game software.

8. The method of claim 6, further comprising a step of disabling a display screen of the wireless communication device when the projector on the surface of the wireless communication device or the extendable and retractable projector from the wireless communication device is enabled for projection of the game-related graphics.

* * * * *